W. R. PETRIE.
LUBRICATOR FOR STEAM ENGINES.
No. 189,875. Patented April 24, 1877.
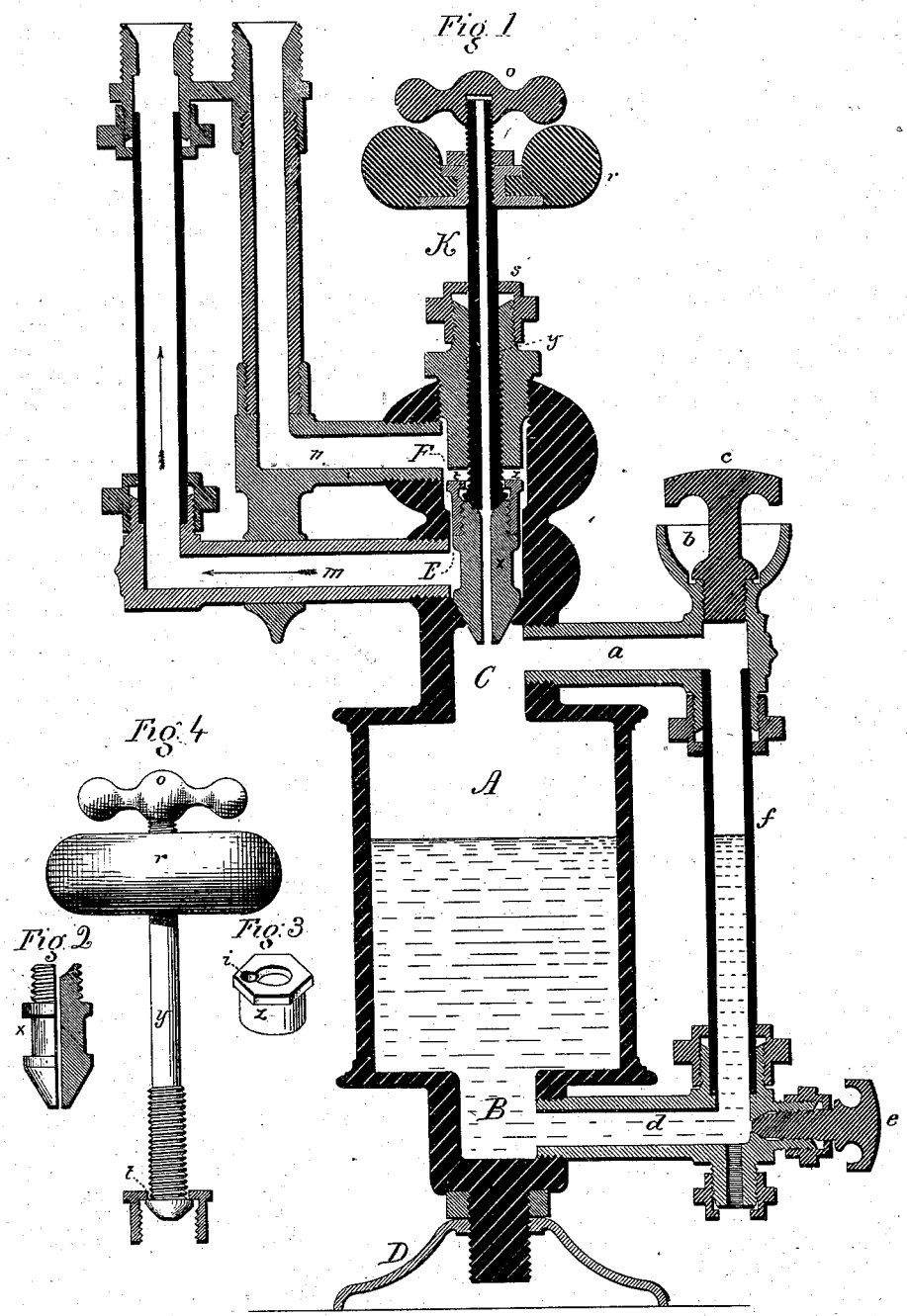

UNITED STATES PATENT OFFICE.

WALTER R. PETRIE, OF NEW HAVEN, CONNECTICUT, ASSIGNOR TO HIMSELF, JOSEPH D. PAYNE, AND LEVI P. WOODWORTH, OF SAME PLACE.

IMPROVEMENT IN LUBRICATORS FOR STEAM-ENGINES.

Specification forming part of Letters Patent No. 189,875, dated April 24, 1877; application filed March 7, 1877.

*To all whom it may concern:*

Be it known that I, WALTER R. PETRIE, of the city and county of New Haven and State of Connecticut, have invented a new and useful Improvement in Lubricators for Steam-Engines, which improvement is fully set forth in the following specification, reference being had to the accompanying drawing, which forms a part of the same.

The object of my invention is to make a lubricator which shall be more certain in its action and more economical in its construction than the lubricators heretofore made.

The invention consists in making the stem in two parts, in the novel construction of the lower part, and so connecting the same that a movement of the stem, according to the direction in which it is turned, opens or closes two ports—an oil and a water port; also, in making the chambers surrounding the stem cylindrical or straight.

Figure 1 is a vertical central section of the lubricator. Fig. 2 shows the lower part of the stem. Fig. 3 shows the cap connecting the two parts of the stem, and Fig. 4 shows the upper part of the stem.

A, Fig. 1, is a cylindrical reservoir for the oil, which is filled by means of the pipe $a$ terminating in the cup $b$ furnished with the stop-cock $c$. C is a small cylinder open at its lower end on the top of the reservoir A, and forming a part of the same, into which the pipe $a$ is inserted. Its upper end opens into the cylindrical chambers E and F, the upper chamber F being the largest. The exterior of these chambers is spheroidal in form, to give them a good appearance. As ordinarily made, the interior of these chambers has corresponded in shape to the exterior. Such being their shape they could not be reamed out, and, as a consequence, the casting sand adhering to the metal was continually falling onto the valve-seats, causing leakage and injury to the valves and need of frequent cleaning. By making them cylindrical or straight they can be reamed, and clean surfaces be obtained—a very great improvement.

B is a cylinder open at its upper end, and forms a part of the reservoir. It is provided with the pipe $d$, having the stop-cock $e$. Through this pipe the contents of the reservoir are drawn off. The pipes $a$ and $d$ are connected by the glass pipe $f$. The pipe $f$ and the reservoir A being in free communication, the height of the oil in the reservoir is shown in the glass tube $f$. D is the base on which the lubricator stands.

The pipe $n$ communicates with the interior of the chamber F, and runs horizontally a short distance, and is then turned to a vertical position, as shown. The pipe $m$ communicates with the interior of the chamber E, and runs parallel with the pipe $n$ a short distance, and is turned to a vertical position. A portion of the pipe $m$ is glass, that the oil may be seen as it passes. Both the pipes $m$ and $n$ communicate with the steam pipe or chest.

The stem or spindle K is made in two parts—a lower part, $x$, and an upper part, $y$. The lower part $x$ has a central perforation throughout its length. Its lower end forms a valve and its upper end a valve-seat. It is made to fit loosely in the chamber E. The upper part $y$ has also a central perforation throughout its length. It is provided with a thumb screw or nut, $o$, to close the orifice at its upper end, and with the circular disk $r$, by which it is turned. It is threaded and turns in the nut $s$, which is screwed into the chamber F. Its lower end is a valve, and a shoulder, $t$, is made near it. The parts of the stem are connected by the cap Z. The cap Z is shown in Fig. 3. It is slipped over the upper end of the upper part $y$ of the stem down to the shoulder $t$. It is made with the hole or water passage $i$, and is screwed onto the upper end of the lower part $x$ of the stem. When screwed onto the lower part $x$ and the parts are connected together, a space is left between the shoulder $t$ and the inside of the top of the cap, which allows the two parts $x$ and $y$ to come together and close the port or water-passage through the lower part $x$ and also to recede from each other sufficiently to open the same.

The operation of my lubricator is as follows: The stop-cock $e$ and $c$ and the orifice at the top of the stem being closed, the reservoir being filled with oil, and the pipe $n$ being filled with water made by the condensation of the steam, to a point higher than the oil is to rise, and the stem K being screwed down, closing the port or water-passage through the part $x$ of the stem, and also closing the port or oil-passage at the bottom of the chamber E, no oil can escape. But as the stem is screwed up it opens the water-port at the upper end of the part $x$ of the stem, the water running through the hole $i$ and through the part $x$ of the stem, and also the oil-port at the bottom of the chamber E, and the oil rises and flows through the pipe $m$ into the steam-pipe, is carried forward by the steam, and lubricates all the parts of the engine with which the steam comes in contact.

Having described my lubricator and the manner of its operation, what I claim as new, and desire to secure by Letters Patent, is—

1. The perforated lower part $x$ of the stem K, its lower end forming a valve, its upper end forming a valve-seat connected to the upper perforated part $y$ by the cap $z$, having the hole $i$, in the way described, substantially as set forth.

2. The stem K, herein described, consisting of two parts, a perforated upper part, $y$, provided with the thumb-screw $o$, for the purpose described, its lower end having a shoulder, $t$, and forming a valve, and a perforated lower part, $x$, the lower end of which forms a valve and its upper end a valve-seat, and the two parts connected together by the cap $z$, having the hole $i$, in the way described, the whole substantially as shown and set forth.

3. In a lubricator, the cylindrical chambers E and F, the larger chamber F being uppermost, arranged above the reservoir A, the pipes $m$ and $n$ respectively communicating with the same, substantially as shown and described.

WALTER R. PETRIE.

Witnesses:
  GEORGE TERRY,
  J. D. PAYNE.